US010532459B2

(12) United States Patent
Watanabe (10) Patent No.: US 10,532,459 B2
(45) Date of Patent: Jan. 14, 2020

(54) INFORMATION PROCESSING APPARATUS, INFORMATION PROCESSING METHOD, AND STORAGE MEDIUM FOR GRASPING AN OBJECT (71) Applicant: CANON KABUSHIKI KAISHA, Tokyo (JP)

(72) Inventor: Daisuke Watanabe, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 83 days.

(21) Appl. No.: 15/077,596

(22) Filed: Mar. 22, 2016

(65) Prior Publication Data
US 2016/0279791 A1 Sep. 29, 2016

(30) Foreign Application Priority Data
Mar. 24, 2015 (JP) .................................. 2015-061685

(51) Int. Cl.
G06K 9/00 (2006.01)
B25J 9/16 (2006.01)

(52) U.S. Cl.
CPC ........... B25J 9/1612 (2013.01); B25J 9/1697 (2013.01); G06K 9/00201 (2013.01)

(58) Field of Classification Search
None
See application file for complete search history.

(56) References Cited

U.S. PATENT DOCUMENTS

| 2006/0104788 | A1* | 5/2006 | Ban | B25J 9/1697 414/729 |
| 2011/0222995 | A1* | 9/2011 | Irie | B25J 9/1687 414/225.01 |
| 2012/0158180 | A1* | 6/2012 | Iio | B25J 9/1679 700/259 |
| 2012/0188209 | A1* | 7/2012 | Kaido | G01C 21/367 345/204 |
| 2014/0017048 | A1* | 1/2014 | Mattern | B25J 9/1612 414/567 |

(Continued)

FOREIGN PATENT DOCUMENTS

| JP | 2000-304509 A | 11/2000 |
| JP | 2006350620 A | 12/2006 |
| JP | 2009-128201 | * 6/2009 |

(Continued)

Primary Examiner — Tahmina N Ansari
(74) Attorney, Agent, or Firm — Canon U.S.A., Inc. IP Division (57) ABSTRACT Setting a target region determined based on a positional relationship between an object and a holding unit at a time of holding the object with the holding unit, acquiring measurement data on a plurality of objects, recognizing positions and orientations of the plurality of objects based on the acquired measurement data and a three-dimensional shape model of the objects, calculating a position of the set target region for each of the plurality of recognized objects based on the recognized positions and orientations of the plurality of objects, performing interference judgment about interference between the holding unit and the object in an order determined based on the positions of the target regions, and causing the holding unit to hold one of the plurality of recognized objects based on a result of the performed interference judgment.

27 Claims, 8 Drawing Sheets (56) References Cited

U.S. PATENT DOCUMENTS

2015/0003678 A1\* 1/2015 Watanabe .............. B25J 9/1697
382/103

FOREIGN PATENT DOCUMENTS

| JP | 2011183537 A | 9/2011 |
| JP | 2012125886 A | 7/2012 |
| JP | 2012187666 A | 10/2012 |

\* cited by examiner

INFORMATION PROCESSING APPARATUS, INFORMATION PROCESSING METHOD, AND STORAGE MEDIUM FOR GRASPING AN OBJECT

BACKGROUND OF THE INVENTION

Field of the Invention

The present invention relates to technologies for grasping with a robot hand a workpiece the three-dimensional position and orientation of which are recognized from among bulk workpieces, based on information about measurement by a sensor.

Description of the Related Art

In recent years, bulk picking technologies have been developed in which an individual object is identified from among a pile of workpieces by use of a vision system and then the three-dimensional position and orientation of the identified object are recognized to grasp the object with a hand attached to a robot in production lines in factories, etc. To realize continuous grasp operations of the robot in a short period of time in the foregoing technologies, it is important to preferentially select a workpiece that is graspable in a surface layer of the bulk where interference with a neighboring object is less likely to occur.

Japanese Patent Application Laid-Open No. 2000-304509 discusses a method in which positional information about relative positions of a plurality of workpieces in the bulk is acquired and an overlapping state of the workpieces is acquired from the positional information to preferentially select a workpiece located in an upper area.

Figure 5:
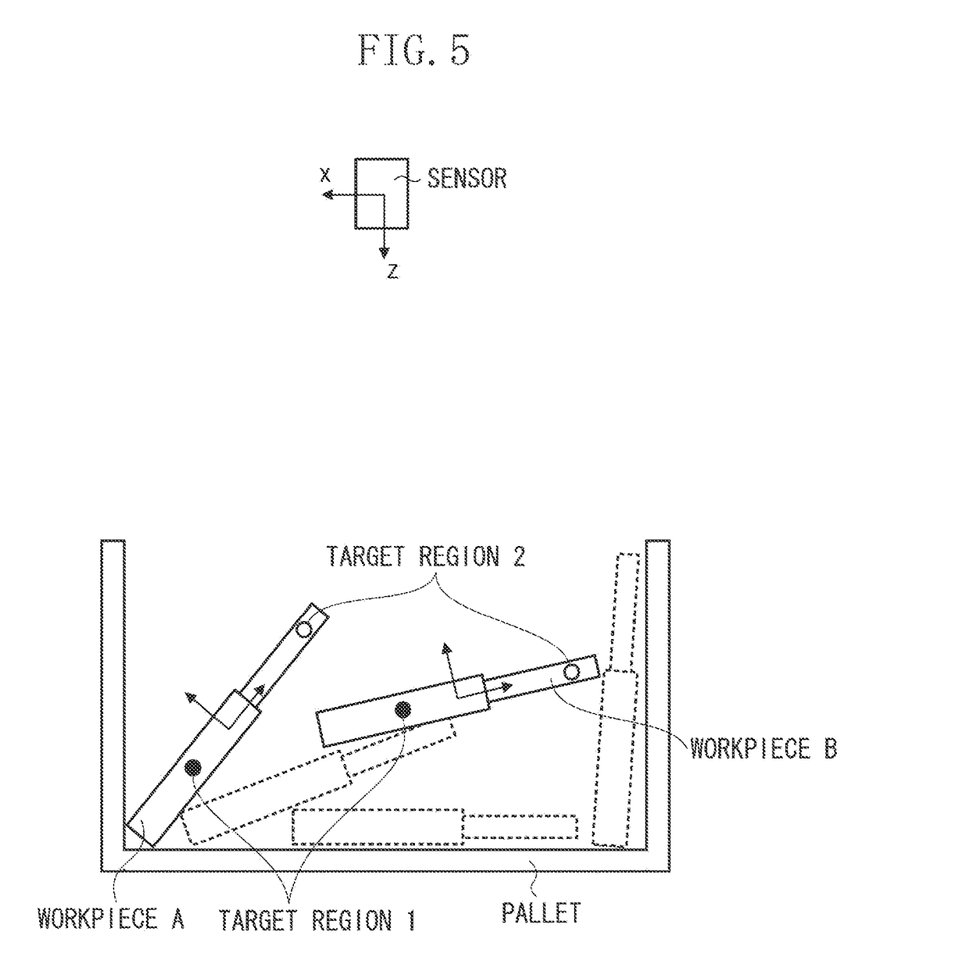
FIG. 5 illustrates a method of determining a bulk workpiece grasping operation according to the first exemplary embodiment.

In the method discussed in Japanese Patent Application Laid-Open No. 2000-304509, the workpieces are rearranged in descending order according to their positions and orientations, and a workpiece located in a high position is preferentially selected. However, in a case where a region to be used as a reference for the position and orientation of a workpiece is different from a region that is to be grasped with a hand, or in a case where a workpiece with a longitudinal shape is graspable by grasping any of a plurality of regions that are significantly different in a longitudinal direction, it is not possible to preferentially select a workpiece that is graspable in a surface layer of the bulk. For example, FIG. 5 illustrates an example in which workpieces having a long shape in a particular direction are stored in bulk (five workpieces in this example) in a pallet. In FIG. 5, detected workpieces are specified by solid lines and referred to as workpieces A and B. Further, each of the workpieces is graspable by grasping either one of the regions referred to as target regions 1 and 2. In this case, the workpiece A can be grasped without interference with other objects in the surface layer of the bulk if the workpiece A is grasped by grasping the target region 1. However, in a case where a height based on the position and orientation of a workpiece is used as a reference, the workpiece B, which is more likely to interfere with a neighboring object, is selected. This decreases processing efficiency.

SUMMARY OF THE INVENTION

According to an aspect of the present invention, an information processing apparatus includes, for example, a setting unit configured to set a target region determined based on a positional relationship between an object and a holding unit at a time of holding the object with the holding unit, a measurement data acquisition unit configured to acquire measurement data on a plurality of objects, a recognition unit configured to recognize positions and orientations of the plurality of objects based on the acquired measurement data and a three-dimensional shape model of the objects, a calculation unit configured to calculate a position of the set target region for each of the plurality of recognized objects based on the recognized positions and orientations of the plurality of objects, an interference judgment unit configured to perform interference judgment about interference between the holding unit and the object in an order determined based on the positions of the target regions, and a control unit configured to cause the holding unit to hold one of the plurality of recognized objects based on a result of the interference judgment performed by the interference judgment unit.

According to another aspect of the present invention, an information processing apparatus includes, for example, a setting unit configured to set a plurality of target regions determined based on a positional relationship between an object and a holding unit at a time of holding the object with the holding unit, a measurement data acquisition unit configured to acquire measurement data on the object, a recognition unit configured to recognize a position and orientation of the object based on the acquired measurement data and a three-dimensional shape model of the object, a calculation unit configured to calculate positions of the plurality of set target regions for the recognized object based on the recognized position and orientation of the object, an interference judgment unit configured to perform interference judgment about interference between the holding unit and the object in an order determined based on the calculated positions of the plurality of target regions, and a control unit configured to cause the holding unit to perform holding at one of the calculated positions of the plurality of target regions based on a result of the interference judgment performed by the interference judgment unit.

An exemplary embodiment of the present invention disclosed herein makes it possible to preferentially select a grasp position and orientation in which interference is less likely to occur at the time of recognizing and grasping a plurality of workpieces.

Further features of the present invention will become apparent from the following description of exemplary embodiments with reference to the attached drawings.

DESCRIPTION OF THE EMBODIMENTS

Information processing apparatuses according to various exemplary embodiments of the present invention will be described in detail below.

Prior to description of exemplary embodiments of the present invention, a hardware configuration applied to the information processing apparatuses according to the respective exemplary embodiments will be described below with reference to FIG. 8.

Figure 8:
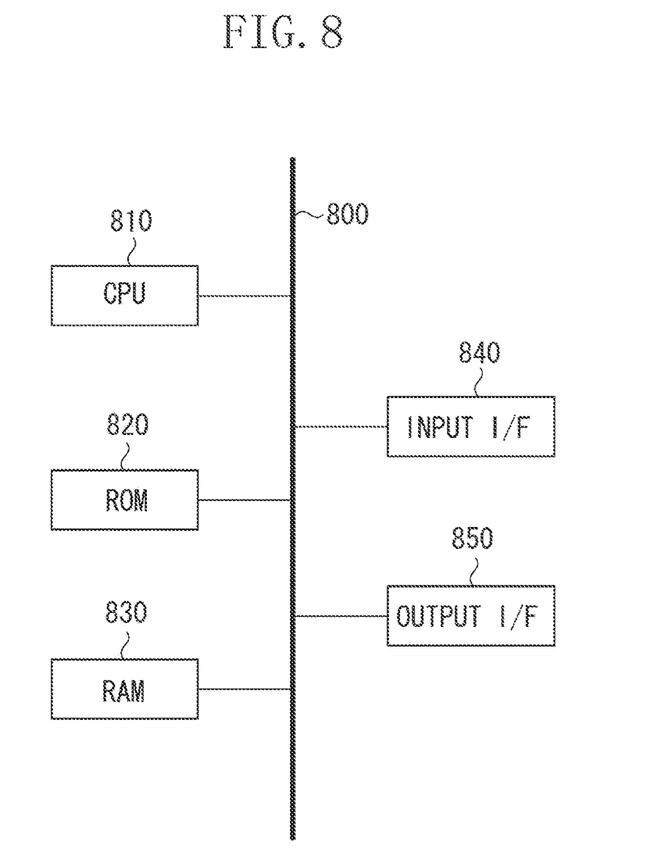
FIG. 8 illustrates an example of the hardware configuration of an information processing apparatus according to an exemplary embodiment of the present invention.

FIG. 8 is a hardware configuration diagram illustrating an information processing apparatus 1 according to an exemplary embodiment of the present invention. In FIG. 8, a central processing unit (CPU) 810 comprehensively controls each device connected via a bus 800. The CPU 810 reads and executes processing steps and programs stored in a read-only memory (ROM) 820. Processing programs, device drivers, etc. including an operating system (OS) according to the present exemplary embodiment are stored in the ROM 820, are temporarily stored in a random access memory (RAM) 830, and are executed by the CPU 810 as needed. Further, an input interface (I/F) 840 inputs an input signal from an external apparatus (sensor, display apparatus, operation apparatus, etc.) in a format that is processable by the information processing apparatus 1. Further, an output I/F 850 outputs an output signal in a format that is processable by an external apparatus (e.g., robot controller).

In a first exemplary embodiment, respective target regions corresponding to grasping methods are preset to workpieces, and a grasp operation is determined based on depth values of respective target regions of a recognized workpiece. In this way, a grasp operation that is less likely to cause interference, e.g., a grasp operation that uses a grasp region existing in a surface layer, is preferentially used to grasp a workpiece, whereby efficient bulk picking is enabled.

Figure 1:
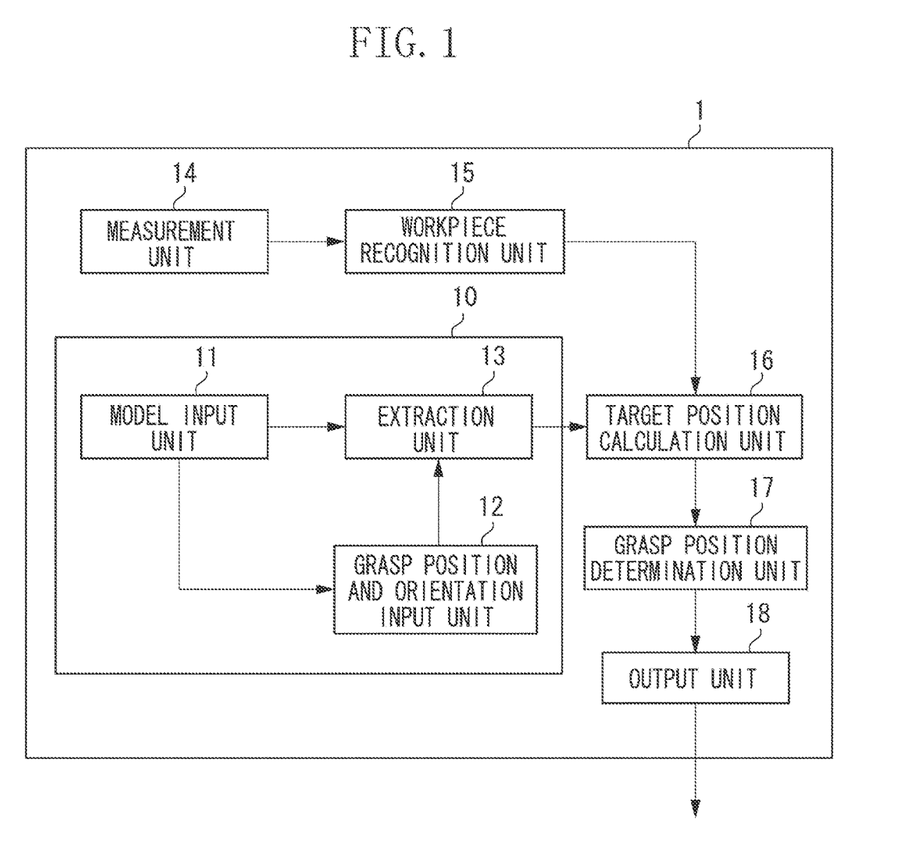
FIG. 1 illustrates the configuration of an information processing apparatus according to a first exemplary embodiment.

FIG. 1 illustrates the configuration of the information processing apparatus 1 according to the present exemplary embodiment.

The information processing apparatus 1 includes a target region input unit 10, a measurement unit 14, a workpiece recognition unit 15, a target position calculation unit 16, and a grasp position determination unit 17. The target region input unit 10 includes a model input unit 11, a grasp position and orientation input unit 12, and an extraction unit 13. The following describes each of the units included in the information processing apparatus 1.

The target region input unit 10 inputs to the target position calculation unit 16 target regions of workpieces that correspond to the respective grasping methods. In the present exemplary embodiment, a grasp operation in which a position to be approached by a robot hand is, if possible, in the bulk surface layer is to be selected preferentially. Thus, an innermost region with respect to the approach direction in the positional relationship between a workpiece and a hand in each grasping method is set as a target region and is input. The target region input unit 10 includes the model input unit 11, the grasp position and orientation input unit 12, and the extraction unit 13. The following describes each of the units included in the target region input unit 10.

The model input unit 11 inputs a three-dimensional shape model of a target workpiece of bulk picking and a three-dimensional shape model of a hand that is to grasp the workpiece. For example, a polygon model that approximately represents the three-dimensional shape of an object (workpiece or hand) can be used as a three-dimensional shape model. A polygon model includes three-dimensional coordinates on a surface of an object shape and connection information about surface points for forming triangular planes (polygon) that approximate the shape. A polygon is triangular in general but may be quadrangular or pentagonal. Any other polygon model that can approximately represent the shape of a workpiece with the coordinates of surface points and connection information about the coordinates can be used. Further, a model that represents a shape with a group of segmented parameter curved surfaces, which is called boundary representation (B-rep) such as computer-aided design (CAD) data, may be used as a three-dimensional shape model. It is also possible to use any other model that can represent the three-dimensional shape of an object.

Figure 2:
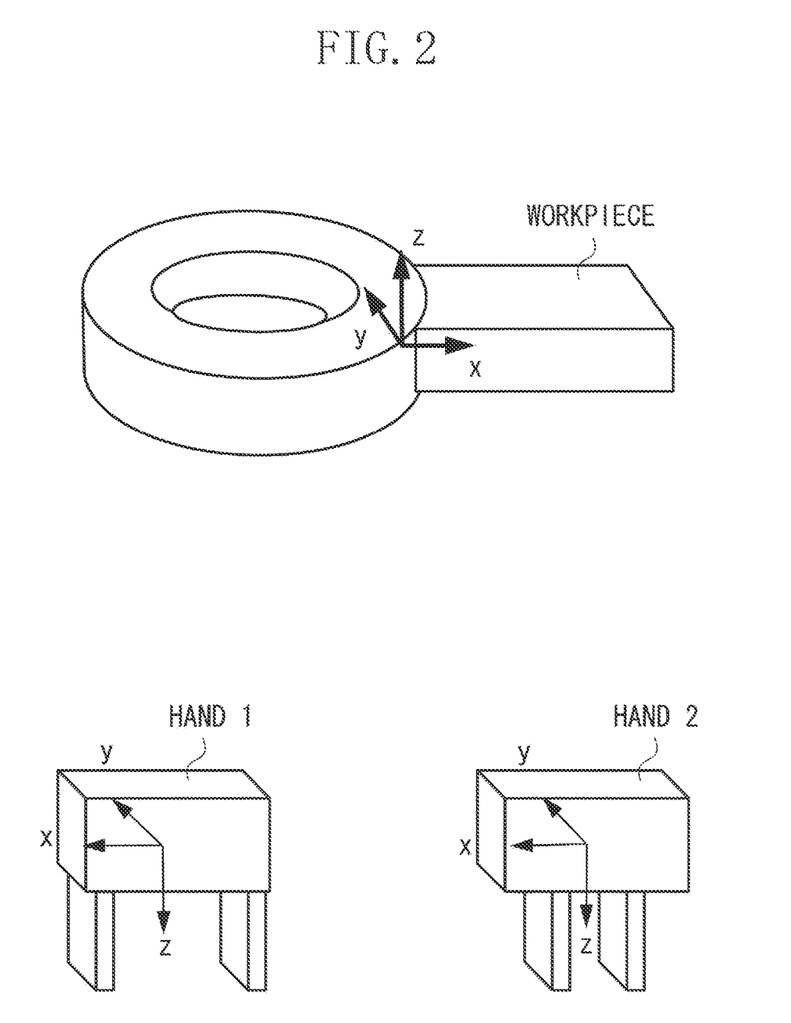
FIG. 2 illustrates three-dimensional shape models of a target workpiece and a hand configured to grasp the workpiece according to the first exemplary embodiment.

FIG. 2 illustrates three-dimensional shape models of a workpiece and a hand configured to grasp the workpiece according to the present exemplary embodiment. In the present exemplary embodiment, the hand that grasps (hold) the workpiece by opening and closing two fingers is used. A hand 1 represents the three-dimensional shape of the hand with the two fingers being opened, and a hand 2 represents the three-dimensional shape of the hand with the two fingers being closed. Three-dimensional shape models of the hand that are suitable for a grasp may be used according to the shape of the workpiece. Even in a case where, for example, an opening/closing hand having three fingers instead of two fingers or a suction type hand is used, three-dimensional shape models suitable for the shape of the hand to be used may be input. A coordinate system is set to each of the workpiece and the hand based on their shapes. Hereinafter, the coordinate systems will be referred to as a workpiece coordinate system and a hand coordinate system. The three-dimensional shape models are used when the extraction unit 13 extracts a target region corresponding to a grasping method (holding method) for grasping (holding) the workpiece.

The grasp position and orientation input unit 12 inputs the relative positions and orientations of the workpiece and the hand at the time of grasping the workpiece based on the coordinate systems of the three-dimensional shape models of the workpiece and the hand that are input by the model input unit 11.

In a case where there is a plurality of grasping methods, a plurality of grasp positions and orientations is input. This will be described below with reference to FIG. 3. For example, suppose that there are two possible grasping methods for the workpiece used in the present exemplary embodiment. The first grasping method is a grasping method 1 (inside grasp) in which the hand with the two fingers being closed is inserted into the center of the ring shape of the workpiece and then the two fingers are opened to grasp the workpiece. The second grasping method is a grasping method 2 (outside grasp) in which the hand with the two fingers being opened surrounds the prism shape of the workpiece and then the two fingers are closed to grasp the workpiece from the outside. At this time, the relative positions and orientations of the workpiece coordinate system and the hand coordinate system in the state in which the workpiece is grasped by the hand with the two fingers being opened, i.e., the hand 1, are input to the extraction unit 13 as the grasp position and orientation for the inside grasp. Further, the relative positions and orientations of the workpiece coordinate system and the hand coordinate system in the state in which the workpiece is grasped by the hand with the two fingers being closed, i.e., the hand 2, are input to the extraction unit 13 as the grasp position and orientation for the outside grasp.

The extraction unit 13 extracts a target region for each of the workpiece grasping methods based on the three-dimensional shape models of the workpiece and the hand and the grasp positions and orientations for the respective grasping methods. The extracted target regions are used when the target position calculation unit 16 calculates the position of a target region with respect to each grasp position (holding position) of the robot hand at the time of grasping a recognized workpiece by the two types of grasping methods described above.

The measurement unit 14 is a sensor configured to acquire measurement information (acquire measurement data) necessary for the recognition of the position and orientation of a target object. For example, the measurement unit 12 may be a camera configured to capture two-dimensional images, a distance sensor configured to capture range images with each pixel having depth information, or a combination thereof. Examples of a distance sensor that can be used include a distance sensor configured to capture with a camera an image of reflection light of laser light or slit light applied to a target and then measure the distance by triangulation, a time-of-flight distance sensor using the time of flight of light, a distance sensor configured to calculate the distance by triangulation from an image captured with a stereo camera, etc. Any other sensor by which information necessary for the recognition of the three-dimensional position and orientation of an object can be acquired may be used without impairing the nature of the present invention. In the present exemplary embodiment, a sensor by which both a range image and a grayscale image can be acquired is used. The measurement information acquired by the measurement unit 14 is input to the workpiece recognition unit 15. Hereinafter, the coordinate system set to the measurement unit 14 will be referred to as a sensor coordinate system.

The workpiece recognition unit 15 detects an individual workpiece from a large number of bulk workpieces and calculates the three-dimensional position and orientation of the detected workpiece in the sensor coordinate system. In the present exemplary embodiment, the measurement unit 14 can acquire a range image and a grayscale image with the sensor. First, voting is conducted on the acquired range image and the acquired grayscale image by use of a classification tree learned in advance, whereby an individual workpiece is detected from the bulk workpieces and the approximate position and orientation of the detected workpiece are calculated. Then, the position and orientation of the workpiece are corrected based on the calculated approximate position and orientation to fit the three-dimensional shape model of the workpiece to the range image and the grayscale image, whereby a highly-accurate position and orientation of the workpiece are calculated. It is also possible to use any other method to calculate the position and orientation of the workpiece in the sensor coordinate system. For example, pattern matching with images observed from a large number of orientations may be conducted in the former stage of the detection of an individual workpiece. Further, fitting may be conducted using only the range image or only the grayscale image in the latter stage of the calculation of highly-accurate position and orientation. Besides the methods described above, any other method can be used by which an individual workpiece that is to be a grasp target can be detected from the bulk workpieces and the three-dimensional position and orientation of the detected workpiece can be calculated.

The target position calculation unit 16 calculates the position (target position) of a target region of a recognized workpiece (object) with respect to each grasp position in the sensor coordinate system based on the three-dimensional position and orientation of the workpiece recognized by the workpiece recognition unit 15 and the target regions input by the target region input unit 10.

The grasp position determination unit 17 determines a grasp position and a grasping method for grasping the workpiece with the robot hand based on the three-dimensional coordinates of the target regions for the respective grasping methods of grasping the recognized workpiece.

The output unit 18 outputs to an external apparatus (e.g., robot controller) the grasp position determined by the grasp position determination unit 17. The robot controller controls the robot hand to grasp the workpiece based on the grasp position and the grasping method that are received from the output unit 18.

The CPU 810 develops a program stored in the ROM 820 to the RAM 830 and executes processing according to a flow chart described below, whereby each function unit included in the information processing apparatus 1 is realized. Further, for example, in a case where hardware is configured as a substitute of the software processing using the CPU 810, a computing unit or a circuit corresponding to the processing of each function unit may be configured.

Figure 4:
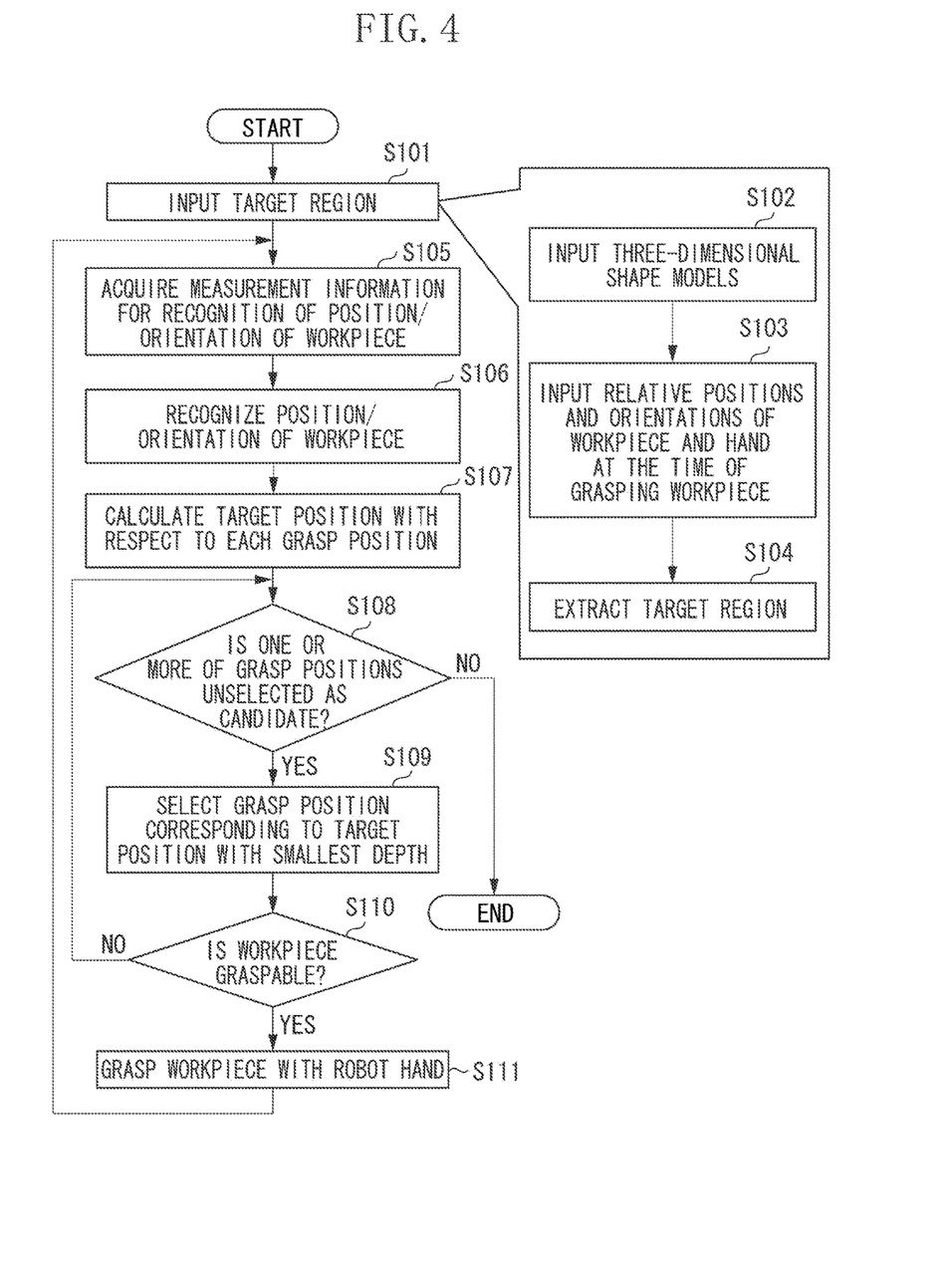
FIG. 4 is a flow chart illustrating a process of determining a bulk workpiece grasping operation and picking according to the first exemplary embodiment.

FIG. 4 is a flow chart illustrating a process according to the present exemplary embodiment in which a grasp position by a set grasping method is determined for a workpiece recognized from the bulk workpieces and the recognized workpiece is grasped with the robot hand.

(Step S101)

In step S101, the target region input unit 10 inputs target regions of a workpiece that correspond to the respective grasping methods of grasping the workpiece. In the present exemplary embodiment, a method will be described in which target regions are extracted and input based on the three-dimensional shape models of the workpiece and the hand and the grasp positions and orientations. In this case, the process includes steps S102 to S104 described below.

(Step S102)

In step S102, the model input unit 11 inputs the three-dimensional shape models of the workpiece and the hand that is to grasp the workpiece.

(Step S103)

In step S103, the grasp position and orientation input unit 12 inputs the relative positions and orientations of the workpiece and the hand at the time of grasping the workpiece based on the respective coordinate systems of the three-dimensional shape models of the workpiece and the hand that are input by the model input unit 11.

(Step S104)

In step S104, the extraction unit 13 extracts target regions for the respective grasping methods of grasping the workpiece.

Figure 3:
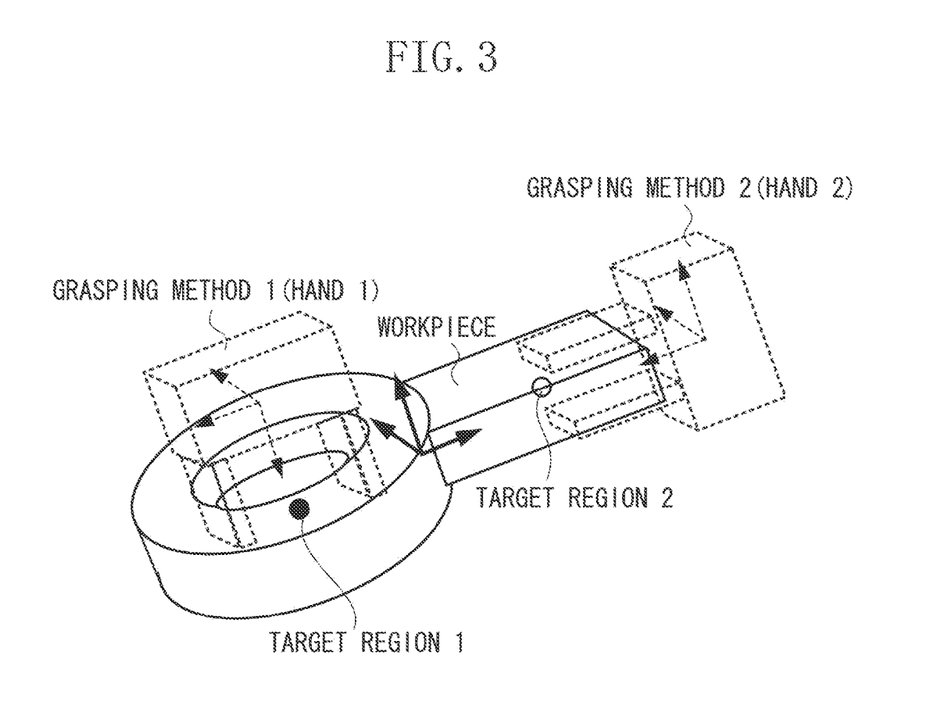
FIG. 3 illustrates workpiece grasping methods and target regions corresponding to the grasping methods.

In the two types of grasping methods in the present exemplary embodiment, the hand is moved in the positive direction along the z-axis of the hand coordinate system to approach the grasp position and orientation of the workpiece. In the grasp position determination in the latter stage, in order to preferentially grasp a workpiece graspable in the vicinity of the bulk surface layer, first, vertexes having the largest coordinate in the z-axis direction in the three-dimensional shape models of the hand are extracted. Specifically, eight vertexes of edges of the two fingers of the hand are extracted. Further, the coordinates of the center of gravity of the vertexes are calculated. In FIG. 3, a target region of the case where the workpiece is to be grasped by inside grasping is specified by a black circle, and a target region of the case where the workpiece is to be grasped by outside grasping is specified by a white circle. Next, based on the grasp position and orientation, the extracted coordinates are converted from coordinate values based on the hand coordinate system into coordinate values based on the workpiece coordinate system and then input.

The target region setting method is not limited to the foregoing method. For example, the position of the center of gravity of the hand may be converted from coordinate values based on the hand coordinate system into coordinate values based on the workpiece coordinate system and then used. Alternatively, the three-dimensional shape models of the hand and the workpiece may be arranged based on the grasp position and orientation, and model planes at which the planes of the three-dimensional shape models at this time are within a predetermined distance and the degree of matching in the normal direction of the planes is within a predetermined value may be extracted as contact regions of the workpiece and the hand at the grasp position to use the positions of the center of gravity of the contact regions. Besides the foregoing, for example, the three-dimensional shape model of the workpiece may be displayed on a graphical user interface (GUI), and the user may select a geometric feature such as a plane, a point, etc. on the workpiece model to use as a target region the position of the center of gravity of the selected geometric feature, etc. Alternatively, the coordinates (x, y, z) of the target region in the workpiece coordinate system may be input as numerical values without the use of a three-dimensional shape model.
(Step S105)

In step S105, the measurement unit 14 acquires measurement information for the recognition of the position and orientation of the workpiece. In the present exemplary embodiment, a range image and a grayscale image are captured. As described above, the sensor may be a camera or any other sensor by which information for the recognition of the position and orientation of the workpiece can be acquired.
(Step S106)

In step S106, the workpiece recognition unit 15 recognizes the position and orientation of the workpiece. Specifically, six parameters representing the position and orientation of the workpiece in the sensor coordinate system are calculated. In the coordinate conversion from the sensor coordinate system to the workpiece coordinate system based on the calculated six parameters, a 3×3 rotation matrix represented by three parameters representing the orientation is denoted by $R_{WS}$, and a 3-column translation vector represented by three parameters representing the position is denoted by $t_{WS}$. In this case, the conversion from the sensor coordinate system $X_S = [X_S, Y_S, Z_S]^T$ to the workpiece coordinate system $X_W = [X_W, Y_W, Z_W]^T$ can be expressed as follows using a 4×4 matrix $T_{WS}$: $X_W' = TwsX_S'$ (Formula 1), where $X_W' = [X_W, Y_W, Z_W, 1]^T$, $X_S' = [X_S, Y_S, Z_S, 1]^T$, and $$T_{WS} = \begin{bmatrix} R_{WS} & t_{WS} \\ 0^T & 1 \end{bmatrix}.$$

(Step S107)

In step S107, the target position calculation unit 16 calculates the positions (target positions) of the target regions with respect to the respective grasp positions at which the recognized workpiece is to be grasped by inside grasp and outside grasp. As illustrated in FIG. 5, bulk workpieces (five workpieces in the present exemplary embodiment) are stored in the pallet. Among the workpieces, two workpieces (A, B) are detected from the bulk workpieces as a result of the processing performed in steps S106 and S107. The detected workpieces are specified by solid lines and referred to as workpieces A and B. The three unrecognized workpieces are specified by broken lines. The coordinates of the target regions are converted from the workpiece coordinate system to the sensor coordinate system based on the positions and orientations of the recognized workpieces, i.e., the positions and orientations of the workpieces in the sensor coordinate system. In this way, the positions (x, y, z) of the target regions 1 and 2 of the recognized workpieces A and B in the sensor coordinate system are calculated. Hereinafter, the respective positions of the target regions 1 and 2 of the workpiece A will be referred to as positions $P_{A1}$ and $P_{A2}$, and the respective positions of the target regions 1 and 2 of the workpiece B will be referred to as positions $P_{B1}$ and $P_{B2}$.
(Step S108)

In step S108, if one or more of the grasp positions corresponding to the target positions $P_{A1}$, $P_{A2}$, $P_{B1}$, and $P_{B2}$ are unselected as a candidate (YES in step S108), the processing proceeds to step S109. On the other hand, if all the grasp positions are already selected as a candidate (NO in step S108), it is determined that there is no more grasp candidate, and the processing is ended.
(Step S109)

In step S109, comparison of the target positions is performed for every one of the grasp positions that are unselected as a candidate, and one grasp position is selected. For example, suppose that all of the four grasp positions of the inside grasp and the outside grasp of the workpiece A and the inside grasp and the outside grasp of the workpiece B that are illustrated in FIG. 5 are unselected. In this case, the z values of the target positions $P_{A1}$, $P_{A2}$, $P_{B1}$, and $P_{B2}$ corresponding to the respective grasp positions are focused, and the grasp position that corresponds to the smallest z value is selected. In this way, a grasp position at which a workpiece is graspable in the bulk surface layer is preferentially selected, i.e., a grasp position at which interference with a neighboring object is less likely to occur is preferentially selected. In the example illustrated in FIG. 5, the z values of $P_{A2}$, $P_{B2}$, $P_{B1}$, and $P_{A1}$ increase in this order, so the outside grasp of the workpiece A is selected first as a candidate.
(Step S110)

In step S110, the grasp position determination unit 17 judges in advance whether the workpiece is graspable at the grasp position selected in step S109. Specifically, the grasp position determination unit 17 judges the orientation of the hand at the grasp position and judges whether interference with a neighboring object (pallet, neighboring workpiece) occurs at the grasp position. In the hand orientation judgment, for example, the hand shape model is arranged at the relative position and orientation corresponding to the grasping method with respect to the recognized workpiece, and the orientation of the hand is judged based on an angle formed by the z-axes of the hand coordinate system and the sensor coordinate system at this time. If the angle is not smaller than a predetermined value, the grasp position determination unit judges that the orientation is unreasonable and the workpiece is not graspable. On the other hand, if the angle is smaller than the predetermined value, the grasp position determination unit 17 judges that the workpiece is graspable. For example, in FIG. 5, the outside grasp of the workpiece B requires the hand to substantially horizontally approach a bottom surface of the pallet to grasp the workpiece B at a grasp position, so the grasp position determination unit 17 judges that the outside grasp is not possible. Alternatively, whether the robot can be controlled to a grasp position may be judged by the robot controller. In the judgment about the occurrence of interference, for example, a three-dimensional space including the bulk workpieces and the pallet is virtually reproduced based on the workpiece recognition result, and whether the hand interferes with a neighboring object at a grasp position is judged. If interference occurs, the grasp position determination unit 17 judges that the workpiece is not graspable. On the other hand, if interference does not occur, the grasp position determination unit 17 judges that the workpiece is graspable. If the grasp position determination unit 17 judges that the workpiece is graspable in both of the foregoing judgments (YES in step S110), the processing proceeds to step S111. On the other hand, if the grasp position determination unit 17 judges that the workpiece is not graspable (NO in step S110), the processing proceeds to step S108.

(Step S111)

In step S111, the output unit 18 outputs to the external robot controller the grasp position judged in step S110 as a position at which the workpiece is graspable. The robot controller controls the robot hand to grasp the workpiece with the robot hand and conduct subsequent operations (conveyance, installation, assembly, etc.) with the hand based on the determined grasp position. Then, the processing proceeds to step S105. In this way, continuous operations on the bulk workpieces by the robot hand can be realized.

The foregoing describes the method according to the first exemplary embodiment in which respective target regions corresponding to grasping methods are preset to workpieces and then a grasp position is determined based on depth values of the target regions of a recognized workpiece. In this way, a grasp is conducted preferentially at a grasp position where interference is less likely to occur, e.g., a grasp region is in a surface layer, whereby efficient bulk picking is enabled.

In the present exemplary embodiment, the coordinates of the target regions are converted from the workpiece coordinate system to the sensor coordinate system in step S107, and a grasp position is selected by comparison using the coordinates (z value) in step S109. This method is effective even in a case where the sensor is horizontally disposed and the user desires to start grasping the workpieces located at smaller distances from the sensor, if grasp positions with smaller z values in the sensor coordinate system are selected. Further, the coordinates of the target regions may be converted to coordinates of a coordinate system other than the sensor coordinate system. For example, the coordinates of the target regions may be converted to coordinates of a robot coordinate system set to a robot if the relative positions and orientations between the robot coordinate system and the sensor coordinate system are known. Alternatively, the coordinates of the target regions may be converted to coordinates of a pallet coordinate system using the pallet storing the workpieces as a reference. A judgment criterion for the coordinates of the target regions needs to be changed according to the converted coordinate system. For example, in a case where the positive direction of the z-axis of the robot coordinate system matches a vertically upward direction, in order to select a grasp position at which a grasp in the surface layer is possible, the largest value is selected in the comparison of the coordinates of the target regions that are converted to the robot coordinate system. Besides the coordinate systems described above, the coordinates of the target regions may be converted to coordinates of any coordinate system if an appropriate criterion can be set in the grasp position selection.

While two target regions are set in the present exemplary embodiment, it is also possible to set only one target region and select a grasp position by comparing calculated target positions of a plurality of workpieces recognized from the bulk workpieces.

Further, in step S109, a grasp position corresponding to a target position with the smallest depth is successively selected from among the unselected grasp positions. Alternatively, all the grasp positions may be sorted in advance based on the depth values of the target positions and the judgment about whether a grasp is possible may be conducted sequentially on the grasp positions in the order from the grasp position corresponding to a smaller depth value.

(Modified Example 1-1)

In the first exemplary embodiment, a grasp position at which a grasp region is in the surface layer is preferentially selected as a position where interference is less likely to occur, based on the depth values of the respective target regions of the recognized workpieces. In a modified example, on the other hand, on the assumption that interference with the pallet is more likely to occur in the vicinity of a side surface of the pallet, a grasp position corresponding to a grasp region that is in the vicinity of a central region of the pallet is preferentially selected. The target workpieces, the hand, and the grasping methods are similar to those in the first exemplary embodiment.

The apparatus configuration according to the present modified example is similar to that of the first exemplary embodiment illustrated in FIG. 1, so description thereof is omitted. Further, the processing flow according to the present modified example is similar to that of the first exemplary embodiment illustrated in FIG. 4, so description thereof is omitted, and only step S109 in which different processing is performed will be described below.

(Step S109)

In step S109, the grasp position determination unit 17 compares the target positions of all the grasp positions that are unselected as a candidate, and selects one of the grasp positions to determine a grasp position. This will be described below with reference to FIG. 6. To simplify the description, it is assumed that the pallet is installed such that the z-axis of the sensor coordinate system passes through the center of the bottom surface of the pallet in the present example. In this case, the target positions at smaller distances from the origin on the X-Y plane of the sensor coordinate system correspond to the grasp regions located closer to the vicinity of the center of the pallet. Thus, a distance d of the position z) of a target region in the sensor coordinate system from the origin of the sensor is calculated using $d=x^2+y^2$. Then, the distances d calculated for the respective target regions are compared, and a grasp position corresponding to the smallest distance d is selected.

Figure 6:
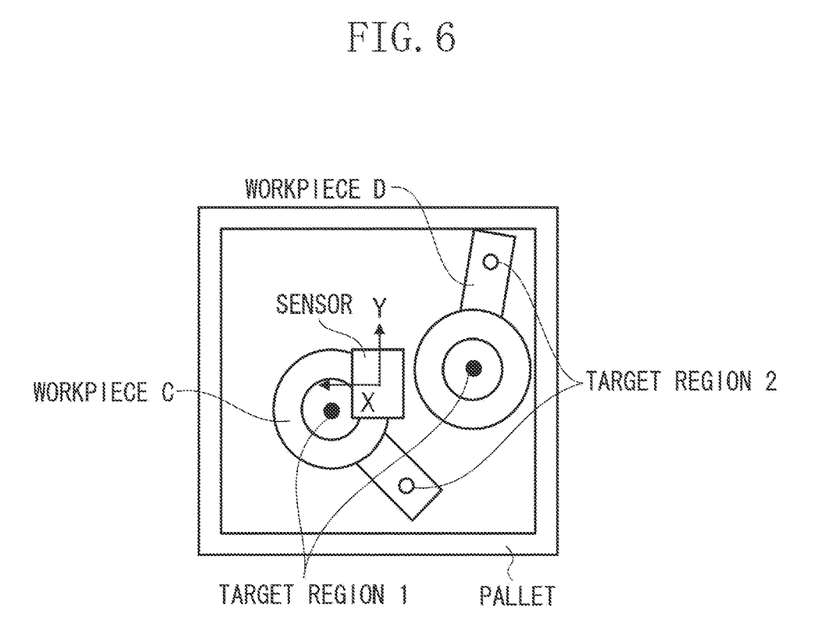
FIG. 6 illustrates a method of determining a bulk workpiece grasping operation according to a modified example 1-1.

For example, in FIG. 6, two workpieces, which are workpieces C and D, are recognized from among the bulk workpieces. The respective positions of target regions 1 and 2 of the workpiece C are referred to as positions $P_{C1}$ and $P_{C2}$, and the respective positions of target regions 1 and 2 of the workpiece D are referred to as positions $P_{D1}$ and $P_{D2}$. In this case, the calculated values of the distances d of the target regions $P_{C1}$, $P_{C2}$, $P_{D1}$, and $P_{D2}$ increase in this order, so the inside grasp of the workpiece C is selected first as a candidate.

By the foregoing method, a grasp is conducted preferentially at a grasp position where interference is less likely to occur, e.g., a grasp region is in the vicinity of the center of the pallet, whereby efficient bulk picking is enabled.

Any evaluation value other than those described above may be used as a grasp position selection method. For example, the evaluation values of the distances z in the depth direction of the sensor coordinate system, which are described in the first exemplary embodiment, may be combined with the evaluation values of the distances d from the origin on the X-Y plane of the sensor coordinate system, which are described in the present modified example, and a grasp position corresponding to a grasp position that is in the bulk surface layer and also in a center of the pallet may be selected preferentially. In this method, the three-dimensional position of a reference point in the sensor coordinate system is preset using as a reference a position corresponding to the upper surface and the center of the pallet, and the three-dimensional distance between a target region and the reference point may be used as an evaluation value. The evaluation value calculation method may be changed to any other method by which a priority level of a grasp region in the three-dimensional space can be set as appropriate.

In the first exemplary embodiment, a grasp position is selected based only on the positions of the respective target regions of a recognized workpiece. In a second exemplary embodiment, a method of selecting a grasp position where interference is less likely to occur will be described in which a priority level is also preset to each grasping method in a case where a plurality of grasping methods has different probabilities of occurrence of interference with a neighboring object. The target workpieces, the hand, and the grasping methods are similar to those in the first exemplary embodiment. In the present exemplary embodiment, it is assumed that interference is less likely to occur in the case of a grasp by the inside grasp than in the case of a grasp by the outside grasp, and a grasp by the inside grasp is preferentially selected.

The apparatus configuration according to the present exemplary embodiment is similar to that of the first exemplary embodiment illustrated in FIG. 1, so description thereof is omitted.

Figure 7:
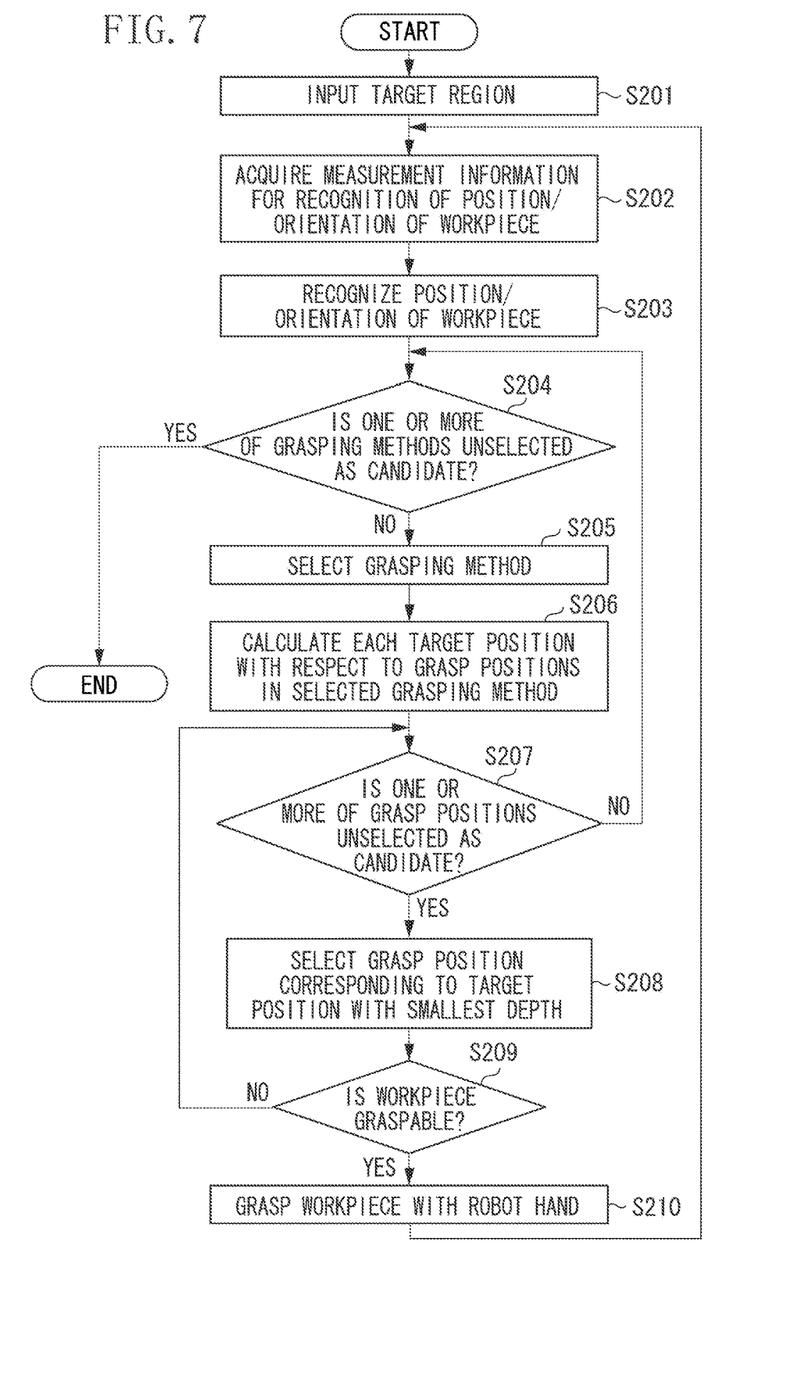
FIG. 7 is a flow chart illustrating a process of determining a bulk workpiece grasping operation and picking according to a second exemplary embodiment.

FIG. 7 illustrates a processing flow according to the present exemplary embodiment. Steps S201, S202, S203, S207, S208, S209, and S210 in FIG. 7 are similar to steps S101, S105, S106, S108, S109, S110, and S111 in the first exemplary embodiment, so description thereof is omitted. Only steps S204, S205, and S206 in which different processing is performed will be described below.

(Step S204)

In step S204, if one or more of the grasping methods (inside grasp, outside grasp) by which a workpiece can be grasped are unselected as a candidate (NO in step S204), the processing proceeds to step S205. On the other hand, if all the grasping methods are already selected as a candidate (YES in step S204), it is determined that there is no more grasp candidate, and the processing is ended.

(Step S205)

In step S205, the grasp position determination unit 17 preferentially selects from among the plurality of grasping methods a method by which interference is less likely to occur. As described above, in the present exemplary embodiment, it is assumed that interference is less likely to occur in the case of a grasp by the inside grasp than in the case of a grasp by the outside grasp, so a grasp by the inside grasp is selected first.

(Step S206)

In step S206, the grasp position determination unit 17 calculates each target position of the recognized workpiece with respect to the grasp positions in the grasping method selected in step S205. For example, in FIG. 5, if the inside grasp is selected as the grasping method, the respective positions (x, y, z) of the target regions 1 of the workpieces A and B in the sensor coordinate system are calculated as positions $P_{A1}$ and $P_{B1}$.

By the foregoing method, a grasp position where interference is less likely to occur can be selected in the case where a plurality of grasping methods has different probabilities of interference.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-061685, filed Mar. 24, 2015, which is hereby incorporated by reference herein in its entirety.

What is claimed is:

1. An information processing apparatus comprising:
one or more processors; and
memory storing executable instructions, which when executed by the one or more processors, cause the information processing apparatus to:
set, for each of a plurality of objects, a first target region at a first position of an object and a second target region at a second position of the object different from the first position, the first target region based on a positional relationship between the object and a holding unit of a robot when the holding unit holds the object at the first position, the second target region based on a positional relationship between the object and the holding unit when the holding unit holds the object at the second position;
obtain, by a sensor, measurement data for the plurality of objects including the object;

recognize positions and orientations of a first object and a second object among the plurality of objects based on the obtained measurement data;

calculate a position of the first target region set for the first object, a position of the second target region set for the first object, a position of the first target region set for the second object, and a position of the second target region set for the second object, based on the recognized positions and orientations of the first object and the second object;

select a position, from among the position of the first target region of the first object, the position of the second target region of the first object, the position of the first target region of the second object, and the position of the second target region of the second object, by comparing the respective positions, and selecting the position corresponding to an optimal position among the respective positions;

determine a position for the holding unit, based on a result of a determination about interference between the holding unit and each of the plurality of objects when the holding unit holds a target region corresponding to the selected position of a target region which, among the first target region of the first object, the second target region of the first object, the first target region of the second object, and the second target region of the second object, is closest to the sensor; and output the position determined for the holding unit.

2. The information processing apparatus according to claim 1, wherein the determination about interference between the holding unit and each of the plurality of objects is performed in an order determined based on distances between the respective positions of the first target region of the first object, the second target region of the first object, the first target region of the second object, and the second target region of the second object, and the sensor.

3. The information processing apparatus according to claim 2, wherein the instructions, when executed by the one or more processors, cause the information processing apparatus to:

locate the holding unit in a position of a target region with the smallest distance from the sensor among the positions of the first target region of the first object, the second target region of the first object, the first target region of the second object, and the second target region of the second object, and perform the determination.

4. The information processing apparatus according to claim 1, wherein the determination about interference between the holding unit and each of the plurality of objects is performed in an order determined based on a distance from a center of an area in which the first object and the second object exists.

5. The information processing apparatus according to claim 4, wherein the instructions, when executed by the one or more processors, cause the information processing apparatus to:

locate the holding unit in a position corresponding to a position of a target region with the smallest distance from the center of the area in which the first object and the second object exists, among the positions of the first target region of the first object, the second target region of the first object, the first target region of the second object, and the second target region of the second object, and perform the determination.

6. The information processing apparatus according to claim 1, wherein the first target region and the second target region are set based on a three-dimensional shape model of the object and a three-dimensional shape model of the holding unit that is to hold the object.

7. The information processing apparatus according to claim 6, wherein the first target region and the second target region are set based also on relative positions and orientations of the holding unit and the object at the time of holding the object.

8. The information processing apparatus according to claim 1, wherein the first position of the first target region corresponds to a first holding method for holding an object, and the second position of the second target region corresponds to a second holding method for holding an object, the second holding method different from the first holding method.

9. The information processing apparatus according to claim 8, wherein respective priority levels are set to the first holding method and the second holding method, and wherein a position of the holding unit is determined from among the positions of the first target region and the second target region based on the respective priority levels.

10. The information processing apparatus according to claim 1, wherein the holding unit holds the object by suction or a grasp.

11. An information processing apparatus comprising:

one or more processors; and memory storing executable instructions, which when executed by the one or more processors, cause the information processing apparatus to:

set, for each of a plurality of objects, a first target region at a first position of an object and a second target region at a second position of the object different from the first position, the first target region based on a positional relationship between the object and a holding unit of a robot when the holding unit holds the object at the first position, the second target region based on a positional relationship between the object and the holding unit when the holding unit holds the object at the second position;

obtain, by a sensor, measurement data for the plurality of objects including the object;

recognize positions and orientations of a first object and a second object among the plurality of objects based on the obtained measurement data;

calculate a position of the first target region set for the first object, a position of the second target region set for the first object, a position of the first target region set for the second object, and a position of the second target region set for the second object, based on the recognized positions and orientations of the first object and the second object;

determine an order of positions, for the position of the first target region of the first object, the position of the second target region of the first object, the position of the first target region of the second object, and the position of the second target region of the second object, by comparing the respective positions, and sorting the positions based on the respective positions in order from a position corresponding to an optimal position according to a criterion;

determine a position for the holding unit based on a result of a determination about interference between the holding unit and each of the plurality of objects in the order determined based on the respective position values corresponding to each of the positions of the first target region of the first object, the second target region of the first object, the first target region of the second object, and the second target region of the second object; and output the position determined for the holding unit.

12. The information processing apparatus according to claim 11, wherein the determination about interference between the holding unit and each of the plurality of objects is performed in an order determined based on distances between the respective positions of the first target region of the first object, the second target region of the first object, the first target region of the second object, and the second target region of the second object, and the sensor.

13. The information processing apparatus according to claim 12, wherein the instructions, when executed by the one or more processors, cause the information processing apparatus to:

locate the holding unit in a position of a target region with the smallest distance from the sensor among the positions of the first target region of the first object, the second target region of the first object, the first target region of the second object, and the second target region of the second object, and perform the determination.

14. The information processing apparatus according to claim 11, wherein the determination about interference between the holding unit and each of the plurality of objects is performed in an order determined based on a distance from a center of an area in which the first object and the second object exists.

15. The information processing apparatus according to claim 14, wherein the instructions, when executed by the one or more processors, cause the information processing apparatus to:

locate the holding unit in a position corresponding to a position of a target region with the smallest distance from the center of the area in which the first object and the second object exists, among the positions of the first target region of the first object, the second target region of the first object, the first target region of the second object, and the second target region of the second object, and perform the determination.

16. The information processing apparatus according to claim 11, wherein the first target region and the second target region are set based on a three-dimensional shape model of the object and a three-dimensional shape model of the holding unit that is to hold the object.

17. The information processing apparatus according to claim 16, wherein the first target region and the second target region are set based also on relative positions and orientations of the holding unit and the object at the time of holding the object.

18. The information processing apparatus according to claim 11, wherein the first position of the first target region corresponds to a first holding method for holding an object, and the second position of the second target region corresponds to a second holding method for holding an object, the second holding method different from the first holding method.

19. The information processing apparatus according to claim 18, wherein respective priority levels are set to the first holding method and the second holding method, and wherein the determination about interference between the holding unit and each of the plurality of objects is performed in an order determined based on the respective priority levels.

20. The information processing apparatus according to claim 11, wherein the holding unit holds the object by suction or a grasp.

21. An information processing method comprising:

setting, for each of a plurality of objects, a first target region at a first position of an object and a second target region at a second position of the object different from the first position, the first target region based on a positional relationship between the object and a holding unit of a robot when the holding unit holds the object at the first position, the second target region based on a positional relationship between the object and the holding unit when the holding unit holds the object at the second position;

obtaining, by a sensor, measurement data for the plurality of objects including the object;

recognizing positions and orientations of a first object and a second object among the plurality of objects based on the obtained measurement data;

calculating a position of the first target region set for the first object, a position of the second target region set for the first object, a position of the first target region set for the second object, and a position of the second target region set for the second object, based on the recognized positions and orientations of the first object and the second object;

selecting a position, from among the position of the first target region of the first object, the position of the second target region of the first object, the position of the first target region of the second object, and the position of the second target region of the second object, by comparing the respective positions, and selecting the position corresponding to an optimal position among the respective positions;

determining a position for the holding unit, based on a result of a determination about interference between the holding unit and each of the plurality of objects when the holding unit holds a target region corresponding to the selected position of a target region which, among the first target region of the first object, the second target region of the first object, the first target region of the second object, and the second target region of the second object, is closest to the sensor; and outputting the determined position for the holding unit.

22. An information processing method comprising:

setting, for each of a plurality of objects, a first target region at a first position of an object and a second target region at a second position of the object different from the first position, the first target region based on a positional relationship between the object and a holding unit of a robot when the holding unit holds the object at the first position, the second target region based on a positional relationship between the object and the holding unit when the holding unit holds the object at the second position;

obtaining, by a sensor, measurement data for the plurality of objects including the object;

recognizing positions and orientations of a first object and a second object among the plurality of objects based on the obtained measurement data;

calculating a position of the first target region set for the first object, a position of the second target region set for the first object, a position of the first target region set for the second object, and a position of the second target region set for the second object, based on the recognized positions and orientations of the first object and the second object;

determining an order of positions, for the position of the first target region of the first object, the position of the second target region of the first object, the position of the first target region of the second object, and the position of the second target region of the second object, by comparing the respective positions, and sorting the positions based on the respective positions in order from a position corresponding to an optimal position according to a criterion;

determining a position for the holding unit based on a result of a determination about interference between the holding unit and each of the plurality of objects in the order determined based on the respective position values corresponding to each of the positions of the first target region of the first object, the second target region of the first object, the first target region of the second object, and the second target region of the second object; and outputting the determined position for the holding unit.

23. A non-transitory computer-readable medium storing instructions that, when executed by a computer of an information processing apparatus, cause the computer to perform a method comprising:

setting, for each of a plurality of objects, a first target region at a first position of an object and a second target region at a second position of the object different from the first position, the first target region based on a positional relationship between the object and a holding unit of a robot when the holding unit holds the object at the first position, the second target region based on a positional relationship between the object and the holding unit when the holding unit holds the object at the second position;

obtaining, by a sensor, measurement data for the plurality of objects including the object;

recognizing positions and orientations of a first object and a second object among the plurality of objects based on the obtained measurement data;

calculating a position of the first target region set for the first object, a position of the second target region set for the first object, a position of the first target region set for the second object, and a position of the second target region set for the second object, based on the recognized positions and orientations of the first object and the second object;

selecting a position, from among the position of the first target region of the first object, the position of the second target region of the first object, the position of the first target region of the second object, and the position of the second target region of the second object, by comparing the respective positions, and selecting the position corresponding to an optimal position among the respective positions;

determining a position for the holding unit, based on a result of a determination about interference between the holding unit and each of the plurality of objects when the holding unit holds a target region corresponding to the selected position of a target region which, among the first target region of the first object, the second target region of the first object, the first target region of the second object, and the second target region of the second object, is closest to the sensor; and outputting the determined position for the holding unit.

24. A non-transitory computer-readable medium storing instructions that, when executed by a computer of an information processing apparatus, cause the computer to perform a method comprising:

setting, for each of a plurality of objects, a first target region at a first position of an object and a second target region at a second position of the object different from the first position, the first target region based on a positional relationship between the object and a holding unit of a robot when the holding unit holds the object at the first position, the second target region based on a positional relationship between the object and the holding unit when the holding unit holds the object at the second position;

obtaining, by a sensor, measurement data for the plurality of objects including the object;

recognizing positions and orientations of a first object and a second object among the plurality of objects based on the obtained measurement data;

calculating a position of the first target region set for the first object, a position of the second target region set for the first object, a position of the first target region set for the second object, and a position of the second target region set for the second object, based on the recognized positions and orientations of the first object and the second object;

determining an order of positions, for the position of the first target region of the first object, the position of the second target region of the first object, the position of the first target region of the second object, and the position of the second target region of the second object, by comparing the respective positions, and sorting the positions based on the respective positions in order from a position corresponding to an optimal position according to a criterion;

determining a position for the holding unit based on a result of a determination about interference between the holding unit and each of the plurality of objects in the order determined based on the respective position values corresponding to each of the positions of the first target region of the first object, the second target region of the first object, the first target region of the second object, and the second target region of the second object; and outputting the determined position for the holding unit.

25. An information processing apparatus comprising:
one or more processors; and
memory storing executable instructions, which when executed by the one or more processors, cause the information processing apparatus to:
set a target region of an object;
calculate positions and orientations of a plurality of objects based on measurement data for the plurality of objects;
calculate positions of the target regions of the plurality of objects based on the calculated positions and orientations of the plurality of objects;
determine whether, when the holding unit holds a selected one among the respective target regions corresponding to the calculated respective positions, the holding unit and an object other than the held object will come into contact with each other with changing the selected one to another one among the respective target regions; and
output a position for holding an object with the holding unit based on a result of the determination.

26. An information processing method comprising:
setting a target region of an object;
calculating positions and orientations of a plurality of objects based on measurement data for the plurality of objects;

calculating positions of the target regions of the plurality of objects based on the calculated positions and orientations of the plurality of objects;

determining whether, when the holding unit holds a selected one among the respective target regions corresponding to the calculated respective positions, the holding unit and an object other than the held object will come into contact with each other with changing the selected one to another one among the respective target regions; and outputting a position for holding an object with the holding unit based on a result of the determination.

27. A non-transitory computer-readable medium storing instructions that, when executed by a computer of an information processing apparatus, cause the computer to perform a method comprising:

setting a target region of an object;

calculating positions and orientations of a plurality of objects based on measurement data for the plurality of objects;

calculating positions of the target regions of the plurality of objects based on the calculated positions and orientations of the plurality of objects;

determining whether, when the holding unit holds a selected one among the respective target regions corresponding to the calculated respective positions, the holding unit and an object other than the held object will come into contact with each other with changing the selected one to another one among the respective target regions; and outputting a position for holding an object with the holding unit based on a result of the determination.

* * * * *